(12) United States Patent
Mattingly et al.

(10) Patent No.: US 10,120,383 B2
(45) Date of Patent: Nov. 6, 2018

(54) SYSTEMS AND METHODS TO DETER THEFT OF COMMERCIAL PRODUCTS

(71) Applicant: Walmart Apollo, LLC, Bentonville, AR (US)

(72) Inventors: Todd D. Mattingly, Bentonville, AR (US); Bruce W. Wilkinson, Rogers, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/813,911

(22) Filed: Nov. 15, 2017

(65) Prior Publication Data

US 2018/0136657 A1 May 17, 2018

Related U.S. Application Data

(60) Provisional application No. 62/423,110, filed on Nov. 16, 2016.

(51) Int. Cl.
*G05D 1/00* (2006.01)
*F41H 13/00* (2006.01)
(Continued)

(52) U.S. Cl.
CPC .............. *G05D 1/0088* (2013.01); *F41H 9/00* (2013.01); *F41H 13/00* (2013.01); *G06Q 50/28* (2013.01)

(58) Field of Classification Search
CPC ......... G05D 1/0088; F41H 9/00; F41H 13/00; G06Q 50/28
See application file for complete search history.

(56) References Cited

U.S. PATENT DOCUMENTS 5,969,595 A 10/1999 Schipper
7,455,225 B1 11/2008 Hadfield
(Continued)

OTHER PUBLICATIONS

Ackerman, Evan; "Startup Developing Autonomous Delivery Robots that Travel on Sidewalks"; http://spectrum.ieee.org/automaton/robotics/industrial-robots/starship-technologies-autonomous-ground-delivery-robots; Nov. 2, 2015; pp. 1-4.
(Continued)

*Primary Examiner* — Nicholas Kiswanto
(74) *Attorney, Agent, or Firm* — Fitch, Even, Tabin & Flannery, LLP (57) ABSTRACT

In some embodiments, autonomous product delivery systems and methods are provided herein useful to deter theft of commercial products via an autonomous ground vehicle ("AGV"). In some embodiments, systems are provided to deter theft of commercial products, and may comprise: an AGV configured to transport commercial products to delivery locations that includes control circuits, which are communicatively coupled to sensors, container storage areas housing commercial products for delivery, defensive elements positioned proximate to the commercial products and configured to physical alter the commercial products and render them unsatisfactory for their intended purpose. The control circuits can determine the presence of unknown third parties positioned next to the AGV and, in response thereto, determine occurrences of adverse events associated with the AGV. Some embodiments, in response to determining the occurrence of adverse events, the control circuits can activate the defensive elements to physically alter the one or more commercial products.

19 Claims, 3 Drawing Sheets

(51) Int. Cl.
*F41H 9/00* (2006.01)
*G06Q 50/28* (2012.01)

(56) References Cited

U.S. PATENT DOCUMENTS

| | | | |
|---|---|---|---|
| 8,253,533 B2 * | 8/2012 | Jones | G07C 9/00103 340/5.61 |
| 8,588,979 B2 | 11/2013 | Decuir | |
| 9,211,648 B2 | 12/2015 | Grinstead | |
| 9,550,577 B1 | 1/2017 | Beckman | |
| 9,573,684 B2 | 2/2017 | Kimchi | |
| 9,934,630 B2 * | 4/2018 | Rephlo | G07C 9/00087 |
| 2007/0008115 A1 | 1/2007 | Morhard | |
| 2009/0072024 A1 | 3/2009 | Bonneau, Jr. | |
| 2010/0050268 A1 * | 2/2010 | Sheymov | G06F 21/31 726/27 |
| 2010/0324731 A1 | 12/2010 | Letsky | |
| 2012/0012101 A1 | 1/2012 | Trujillo | |
| 2012/0086569 A1 | 4/2012 | Golden | |
| 2013/0033381 A1 | 2/2013 | Breed | |
| 2013/0117867 A1 | 5/2013 | Fung | |
| 2015/0006005 A1 | 1/2015 | Yu | |
| 2015/0120094 A1 | 4/2015 | Kimchi | |
| 2015/0242806 A1 | 8/2015 | Cousins | |
| 2015/0277440 A1 | 10/2015 | Kimchi | |
| 2016/0196755 A1 | 7/2016 | Navot | |
| 2016/0257401 A1 | 9/2016 | Buchmueller | |
| 2016/0297400 A1 * | 10/2016 | Krishnan | B60R 25/241 |
| 2016/0337863 A1 * | 11/2016 | Robinson | H04W 12/08 |
| 2017/0110017 A1 | 4/2017 | Kimchi | |
| 2018/0114761 A1 * | 4/2018 | Chua | H01L 23/573 |

OTHER PUBLICATIONS

Dezeen; "Grocery-delivering robots launched by Skype co-founders to be tested in London next year"; http://www.dezeen.com/2015/11/10/grocery-delivering-robots-launched-skype-co-founders-london-trial/; available at least as early as Jun. 1, 2016; pp. 1-30.

PCT; App. No. PCT/US2017/061666; International Search Report and Written Opinion dated Feb. 2, 2018.

* cited by examiner

SYSTEMS AND METHODS TO DETER THEFT OF COMMERCIAL PRODUCTS

RELATED APPLICATION(S)

This application claims the benefit of U.S. Provisional application No. 62/423,110, filed Nov. 16, 2016, which is herein incorporated by reference in its entirety.

TECHNICAL FIELD

This invention relates generally to deterring theft of commercial products.

BACKGROUND

Delivering commercial products via autonomous or semi-autonomous vehicles to customers typically requires less time compared to traditional (i.e., manned) delivery services. Such decreases in delivery time can potentially aid merchants in providing psychologically beneficial shopping events to their customers.

BRIEF DESCRIPTION OF THE DRAWINGS

Disclosed herein are embodiments of systems, apparatuses and methods pertaining to deterring theft of commercial products. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

In some embodiments, autonomous product delivery systems are provided to deter theft of commercial products, and may comprise: an AGV on a commercial product delivery route and configured to transport one or more commercial products to one or more delivery locations. The AGV may include one or more control circuits, one or more container storage areas communicatively coupled to the one or more control circuits and housing therein one or more commercial products for delivery, one or more sensors communicatively coupled to the control circuit and configured to transmit sensor data to the control circuit, and one or more defensive elements communicatively coupled to the one or more control circuits. The one or more defensive elements may be positioned proximate to the commercial products and configured to physically alter the one or more commercial products and thereby render the one or more commercial products unsatisfactory for their intended purpose. The control circuit(s) can determine the presence of one or more unknown third parties positioned within a threshold distance relative to the AGV. In response to determining the presence of the unknown third parties, the control circuit(s) can determine occurrences of one or more adverse events associated with the AGV. Some embodiments, in response to determining the occurrence of an adverse event, the control circuit(s) can activate the one or more defensive elements to physically alter the one or more commercial products.

In some embodiments, methods of autonomous product delivery are provided for deterring theft of commercial products. Some of these methods determine, using sensor data from a sensor of an AGV on a commercial product delivery route, a presence of one or more unknown third parties positioned within a threshold distance relative to the AGV. The AGV may include one or more container storage areas as well as one or more defensive elements positioned proximate to each of the container storage areas. Each container storage area may be configured to house one or more commercial products therein. The defensive element(s) may be configured to physically alter the commercial product(s) and thereby render them unsatisfactory for their intended purpose. When the presence of the one or more unknown third parties is determined, the occurrence of one or more adverse events associated with the AGV may be determined using sensor data and through the AGV. One or more defensive elements may be activated to physically alter the one or more commercial products when the occurrence of the adverse event(s) is determined.

Figure 1:
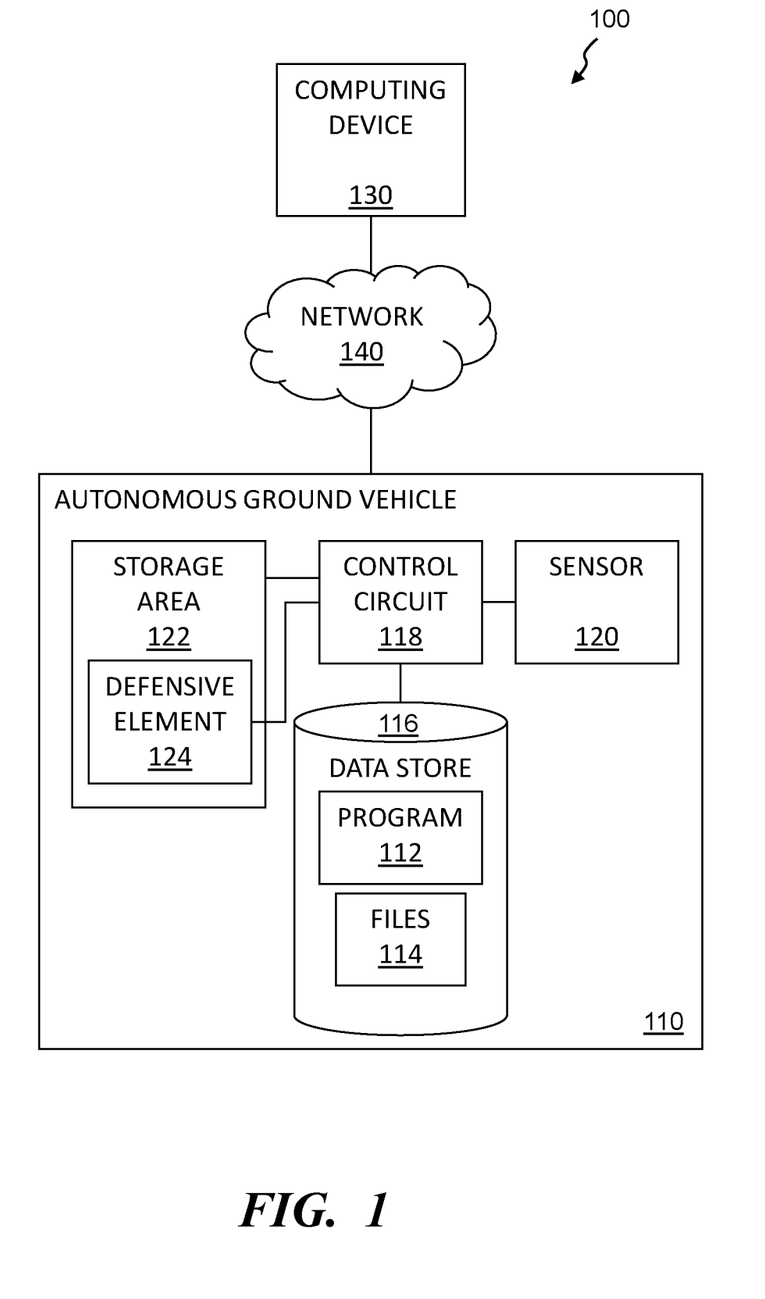
FIG. 1 illustrates a simplified block diagram of a system to deter theft of commercial products, in accordance with some embodiments.

FIG. 1 illustrates a simplified block diagram of a system 100 to deter theft of commercial products, in accordance with some embodiments. The system, in some applications, includes one or more autonomous ground vehicles ("AGVs") 110, and one or more computing devices 130 configured to communicate over a computer and/or one or more communication networks 140. Network 140 can be, for example, a local area network (LAN), a wide area network (WAN) such as the Internet, or a combination of the two, and includes wired, wireless, or fiber optic connections. In general, network 140 can be any combination of connections and protocols that can support communications between computing devices 130 and AGVs 110, in accordance with some embodiments. Computing devices 130 can facilitate the delivery of commercial products. Computing devices 130 can each be a desktop computer, laptop computer, a thin client, a wearable computing device, or a mobile device, including but not limited to, smart phones, phablets, and tablets.

The computing devices 130 can be configured to transmit one or more delivery orders to the AGVs 110, receive information related to one or more adverse events associated with the AGVs 110 (e.g.,), receive geospatial information on the location of the AGVs 110, similar central control functionalities, or a combination of two or more thereof. For example, delivery orders can include information that instructs the AGVs 110 to deliver one or more commercial products to one or more delivery recipients (e.g., customers, giftees, other AGVs, warehouses, distribution centers, similar recipients, or a combination of two or more thereof). Delivery orders include information associated with one or more commercial products (e.g., product names, manufacturer name, manufacture date, serial number, and/or similar commercial product information), delivery destinations, commercial product pickup locations, delivery recipients, routes, similar delivery information, or a combination of two or more thereof.

The AGV 110 is a vehicle configured to autonomously traverse one or more intended environments in accordance with one or more routes and/or determined paths, and typically without the intervention of a human, while transporting commercial products. In some instances, however, a remote operator may temporarily or permanently take over operation of the AGV 110 using feedback information from the AGV 110 (e.g., audio and/or video content, sensor information, etc.) communicated to a remote navigation center and/or central control system (e.g., via network 140 or other similar distributed network). AGV 110 can comprise one or more data stores 116, sensors 120, storage areas 122, and defensive elements 124 each in communication with one or more control circuits 118. In some embodiments, storage areas 122 and defensive elements 124 are implemented together through a single device.

Further, an AGV 110 can include one or more propulsion systems (e.g., motors, wheels, tank treads, etc.) that enable the AGV to at least accelerate, deaccelerate, and/or traverse an environment using a navigation coordinate system, such as GPS, coordinate mapping information, beacon location information, cellular signal triangulation, other navigation systems and/or information, or a combination of two or more of such navigation systems and/or information. Further, the navigation coordinate system can be configured to provide location information, and in some instances time information. In some embodiments, the AGV 110 is configured to operate in different weather conditions, and/or can be readily modified depending on expected weather conditions (e.g., wheels replaced with tank treads when it is anticipated that the AGV 110 may encounter snow and/or ice). AGV 110 can, in some applications, be further configured to communicate with other AGVs, autonomous vehicles, transport vehicles, multiple different types of computing devices, a remote central control system, other computing devices, remote databases, and/or other such devices. The AGV 110 typically includes one or more wired and/or wireless transceivers enabling one or more different modes of communication (e.g., cellular, satellite, Wi-Fi, Ethernet, etc.).

Storage areas 122 can be configured to store one or more commercial products, in accordance with some embodiments. For example, commercial products can include, but are not limited to, one or more perishable products, non-perishable products, pharmaceuticals, apparel items, chemical products, similar commercial products, or a combination of two or more thereof. Storage areas 122 are typically configured to secure the commercial products stored therein. In certain embodiments, storage areas 122 can include one or more locking mechanisms communicatively coupled to control circuits 118. For example, storage areas 122 can be climate controlled (e.g., pressure, temperature, humidity, or a combination of two or more thereof). Storage areas 122 can each include one or more defensive elements 124 positioned proximate to one or more surfaces of the storage areas 122. In embodiments wherein a storage area 122 includes two or more defensive elements 124 positioned proximate thereto, the defensive elements 124 can employ one or more types of defensive mechanisms. For example, the defensive elements 124 can be configured to include one or more reservoirs storing one or more chemicals, and one or more dispensers coupled with the reservoirs, wherein activation of the defensive element 124 causes activation of the dispensers to dispense the chemicals from the reservoirs onto a surface of or within the one or more commercial products included in the storage area 122.

In certain embodiments, the defensive elements 124 can be configured to include one or more expanding components, wherein the activation of the defensive element 124 can include activating the one or more expanding components to at least partially compress the commercial products included in storage area 122. In other embodiments, the defensive elements 124 can include one or more projectile discharging systems, wherein activation of the one or more defensive elements can include activating the one or more projectile discharging systems to discharge one or more projectiles into at least a portion of the one or more commercial products included in the storage area 122. Alternatively or additionally, the defensive elements 124 can include one or more high potential energy materials, wherein activation of the defensive elements 124 can includes activating the materials in a manner to cause the materials to undergo a detonation or a deflagration proximate to the one or more commercial products stored in the storage area 122.

The AGV 110 further typically includes one or more sensors 120. The sensors 120 can include substantially any relevant device that provides information to the AGV 110 to be used in navigation, customer detection, adverse event detection, distance measurements, environment mapping, location determination, and/or other such sensor information. In some embodiments, the sensor 120 includes one or more devices that can be used to capture data related to one or more objects located within a threshold distance relative to AGV 110. For example, one or more sensors 120 can be included and/or cooperated with the AGV 110 that include, but are not limited to, one or more sensors to detect an object within one or more threshold or predetermined distances of the AGV 110, capture data within a threshold distance relative to AGV 110, detect movement, capture images and/or video (e.g., thermographic, infrared, and/or multi-spectral images), capture images of entities attempting to tamper with the AGV 110, capture acceleration data, capture orientation data, generate geospatial data, capture sound (e.g., to capture audible authentication codes and/or voice prints, threatening language, verbal input from customers, verbal inquiries from customers, etc.), capture distance data (e.g., laser sensors, sonar sensors, sensors that measure distance by emitting and capturing a wireless signal, which can comprise light and/or sound etc.), scan 3D objects, other such sensors capabilities, or a combination of two or more of such sensor capabilities.

For example, one or more sensors 120 can be communicatively coupled to one or more access panels of the AGV 110 and/or positioned adjacent to such access panels in a manner to detect when such panels are tampered with. In some embodiments, one or more data stores 116 provide an information repository that typically stores programs 112 and files 114. The AGV 110 may, in some embodiments, further access one or more programs 112, files 114 and/or other relevant information external to AGV 110 and accessible via network 140. Files 114 can comprise information transmitted by computing device 130, data captured by the sensors 120, customer information, customer identifier information (e.g., customer biometric data, authentication codes, similar identifying information, or a combination of two or more thereof), product information, customer order information, navigation and/or routing information, location information, mapping information, AGV identifier information, communication procedures, adverse event information, sensor data, images, video, historic information, and/or other such information.

Files 114 can comprise predetermined biometric data associated with one or more customers (i.e., delivery recipients), which can be used for authentication purposes, and/or determining adverse events. Applicable biometric data can include, but is not limited to voice prints, iris-patterns, retina-patterns, hand geometries, earlobe geometries, facial landmarks, thermographic signatures, vascular patterns, skin texture data points, and/or walking gate data points. Predetermined biometric data can include data previously captured by the sensors 120, provided by customers, external sensors, computing devices 130, and/or received from an external central computing system.

As described above, the AGV 110 may further include programs 112 that are stored in the data store 116 and/or other memory, and utilized at least by the one or more control circuits 118. In some applications, one or more of the programs 112 are software that are executed by the one or more control circuits 118 to facilitate the operation, control, commercial activity, rendering one or more commercial products unsatisfactory for their intended purpose, detecting adverse events, and the like of the AGV 110. Adverse events, for example, can refer to events that typically have a high correlation with theft of commercial products. In certain embodiments, adverse events can include the presence of one or more unknown third parties positioned within a threshold distance relative to the AGV 110, a loss of wireless communication capability (e.g., with a central control system, computing devices 130, and/or similar computing devices) by the AGV 110, a loss of primary power supply by the AGV 110, attempts to gain unauthorized access to the AGV 110, similar adverse events, or a combination of two or more thereof.

In some embodiments, the one or more control circuits 118, invoking one or more programs 112, can use data generated by sensors 120 to determine when one or more adverse events occurs relative to the AGVs 110. The control circuits 118, invoking programs 112, can activate the one or more defensive elements 124 when the occurrence of adverse events are determined. Additionally or alternatively, control circuits 120, invoking programs 112, can generate one or more types of biometric data (discussed above) using data captured via sensors 120, and determine whether the generated biometric data has one or more threshold relationships to predetermined biometric data included in files 114. Here, generated biometric data having the one or more threshold relationships to predefined parameters identifying customers (i.e. a known parties) and generated biometric data lacking such threshold relationships typically identify unknown third parties (i.e., an adverse event). For example, unknown third parties can include unknown persons, biological entities, AGVs, or a combination of two or more thereof.

For example, an AGV 110 can receive one or more commercial products for storage in storage area 122 at a warehouse, brick-and-mortar commercial entity, a distribution center, another AGV, similar entities, or a combination of two or more thereof. The AGV 110 can further receive, from computing device 130, one or more delivery orders associated with the received commercial products that include customer names, customer identification information (discussed above), delivery routes, delivery destination information, similar delivery details, or a combination of two or more thereof.

During attempts to service the one or more received delivery orders, the control circuits 118 can invoke the programs 112 to deter the theft of the one or more commercial products. For example, the AGVs 110 can traverse an environment to engage in delivering one or more commercial products, picking one or more commercial products up for return, retrieving one or more commercial products to subsequently be delivered to a location or customer, obtaining video content, obtaining one or more samples through the application of one or more sensors, performing one or more commercial activities, perform one or more other relevant tasks, or combination of two or more tasks. As discussed above, the safety and/or normal operation of the AGVs 110 typically necessitates the need for the AGVs 110 to have situational awareness of its immediate environment.

The control circuits 118, invoking programs 112, can instruct the sensors 120 to capture data of objects positioned within a perimeter having a predetermined threshold distance relative to the AGV. The perimeter may reflect the radius at which the AGVs 110 can identify unknown third parties and take one or more evasive actions in response thereof, a radius that reflects the extent of the operational range of the one or more sensors 120, a radius that compensates for AGV 110 velocity and supports normal AGV operation (for example, data generation by sensors 120 and subsequent processing thereof) at velocities, or a combination of two or more of the aforementioned tasks. In certain embodiments, the perimeter can be set by a central control circuit, computing device 130, AGV 110, the defensive element 124 requirements, or any combination of two or more thereof. The control circuits 118, invoking programs 112, can use data captured by sensors 120 to detect adverse events. As discussed above, adverse events typically reflect activities that can have a probability of resulting in the unauthorized access to one or more storage areas 122 by unknown third parties.

For example, the control circuits 118, invoking programs 112, can use data captured by sensors 120 to detect the presence of one or more unknown third parties as discussed above, and activate one or more defensive elements 124 in response thereto. In certain embodiments, the control circuits 118, invoking programs 112, can instruct sensors 120 to transmit and receive one or more wireless signals (e.g., a test signal) to a central control circuit, computing device 130, another AGV, similar computing entities, or a combination of two or more thereof. Here, an inability to transmit and/or receive wireless signals reflects that sensors 120 are not capable of wireless communication. In response to determining that sensors 120 are unable to communicate wirelessly, control circuits 118, invoking programs 112, can activate one or more defensive elements 124. Although not shown, AGVs 110 can comprise one or more primary electrical power sources that can energize the one or more propulsion systems, storage areas 122, sensors 120, control circuits 118, or a combination of two or more thereof.

Here, the control circuits 118, invoking programs 118, can instruct sensors 120 to capture data that reflects whether the one or more propulsion systems, storage areas 122, sensors 120, control circuits 118, or a combination of two or more thereof are receiving power from the primary electrical power sources (i.e. have lost primary power). In response to determining that one or more of the aforementioned components have lost electrical communication with the electrical primary power sources, control circuits 118, invoking programs 112, can activate one or more defensive elements 124. In other embodiments, the control circuits 118, invoking programs 112, can receive one or more triggering events from sensors 120 when the sensors determine that one or more access panels of AGV 110 and/or storage areas 122 are tampered with, and activate one or more defensive elements 124.

In response to detecting one or more adverse events, AGVs 110 can activate the defensive elements 124. For example, each storage area 122 can be equipped with one or more defensive elements 124. Defensive elements 124 can be separate components affixed to storage areas 122 or may be integrated therein. Each storage areas 122 can include one or more types of defensive elements 124 (discussed further below). Defensive elements 124 can be permanently or temporarily affixed to surfaces of the storage areas 122. In certain embodiments the defensive elements 124 can comprise one or more reservoirs storing one or more chemicals and one or more dispensers coupled to the reservoirs. In response to detecting one or more adverse events, control circuits 118, invoking programs 112, can instruct the defensive elements to activate the dispensers to dispense the chemicals from the reservoirs onto one or more surfaces of or within the commercial products stored in the associated storage area 122.

The chemicals, for example, can include, but are not limited to, saline, water, chlorine, caustic chemicals, noxious chemicals, pungent chemicals, similar chemicals, or a combination of two or more thereof. Here, dispensing the chemicals onto the surfaces of the commercial products can result in the discoloration of the commercial products, partial or complete disintegration of the commercial products, olfactionally repelling the unknown third party away from the commercial products, similar activities, or a combination of two or more thereof.

In certain embodiments, the defensive elements 124 can comprise one or more expanding components. In response to detecting one or more adverse events, control circuits 118, invoking programs 112, can instruct the defensive elements 124 to activate the expanding components to at least partially compress the commercial products stored in the storage area 122. Here, for example, the expanding components can be configured to compress, squash, crush, break, perform similar structural activities, or a combination of two or more thereof. For example, activating the expanding components can render the commercial products operationally inoperative, non-functioning, and/or inconsumable.

In other embodiments, the defensive elements 124 can comprise one or more projectile discharging systems. In response to detecting one or more adverse events, control circuits 118, invoking programs 112, can instruct the defensive elements 124 to activate the projectile discharging systems to discharge one or more projectiles into at least a portion of the one or more commercial products. The projectiles, for example, can include one or more metallic materials (e.g., steel, aluminum, copper, alloys, tin, tungsten, lead, similar metals, or a combination of two or more thereof). The projectiles can have a shape that is circular, oblong, polygonal, similar geometric shapes, or a combination of two or more thereof. In certain embodiments, the projectiles can be frangible projectiles formed using one or more metallic powders (e.g., steel, aluminum, copper, brass, zinc, tungsten, similar metal, or a combination thereof) bound in one or more binders (e.g., an adhesive, a wax, a polymer, similar materials, or a combination thereof).

The use of frangible projectiles may reduce the probability that components of the AGV 110 positioned beyond the storage areas 122 (e.g., any components of the AGV 110) may be compromised by the projectiles when the projectile discharging systems are activated. Alternatively or additionally, the use of frangible projectiles can reduce the probability that pedestrians, unknown third parties, similar individuals, or a combination of two or more thereof that may be positioned proximate to the AGV 110 are injured by the projectiles when the projectile discharging systems are activated. In some embodiments, the projectile discharging systems can utilize chemical energy and/or pressurized gas (e.g., air, $CO_2$, nitrous, $O_2$, similar gases, or a combination of two or more thereof) to discharge the projectiles. In certain embodiments, activating the projectile discharging systems renders the commercial products included in the storage areas 122 operationally inoperative, non-functioning, inconsumable, similar structural states, or a combination of two or more thereof.

Defensive elements 124 can be chosen to render particular types of commercial products to be stored in storage area 122 unsatisfactory for their intended purpose when activated. For example, the use of chemical dispersants may be suitable for commercial products that can be deemed unsatisfactory for their intended purpose when at least partially diluted, coagulated, discolored, shrunken, disintegrated, emitting unpleasant odors, similar physical abnormalities, or a combination of two or more thereof (e.g., apparel items, perishable food items, non-perishable food items, pharmaceuticals, similar commercial products, or a combination of two or more thereof). The use of expanding components, for example, may be suitable for commercial products that may be deem unsatisfactory for their intended purpose when at least partially compressed, broken, chipped, dented, bent, twisted, similar structural phenomena, or a combination of two or more thereof (e.g., perishable food items, non-perishable food items, pharmaceuticals, products comprising polymers, products comprising metals, similar commercial products, or a combination of two or more thereof).

The use of projectile discharging systems or high potential energy materials may be suitable for commercial products that may be deemed unsatisfactory for their intended purpose when at least partially ripped, sheared, shattered, cracked, burned, sintered, incinerated, splintered, fragmented, mangled, penetrated, similar physical phenomena, or a combination of two or more thereof (e.g., perishable food items, apparel, equipment, products comprising rigid structures, similar commercial products, or a combination of two or more thereof). For example, the results of activating the defensive elements can be immediate (e.g., occur in one second or less) or may occur within a predetermined time period, which may allow the defensive elements to be disarmed. In certain embodiments, control circuits 118, invoking programs 112, can receive a notification to disarm the activated defensive elements 124 from customers, central control circuits, computing devices 130, law enforcement agents or authorities, similar entities, or a combination of two or more thereof. In response to receiving the notification, control circuits 118, invoking programs 112, can deactivate the defensive elements.

For example, control circuits 118, invoking programs 112, can capture one or more audio signals via sensors 120 and compare the captured audio signals to one or more deactivation audio signals included in files 114. In response to determining that the captured audio signals has one or more threshold relationships to the one or more deactivation audio signals included in files 114, control circuits 118, invoking programs 112, can deactivate the defensive elements 124.

Figure 2:
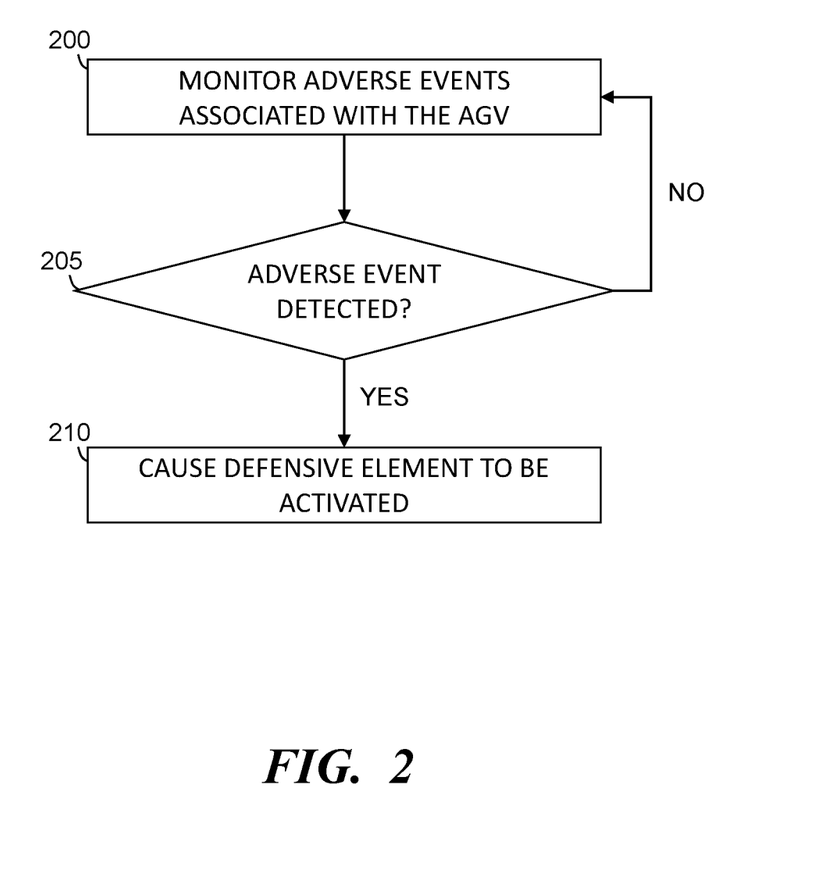
FIG. 2 is a flowchart of an exemplary process of deterring theft of commercial products, in accordance with several embodiments.

FIG. 2 is a flowchart of an exemplary process of enabling delivery of commercial products, in accordance with several embodiments. The process of FIG. 2 may be performed by one or more of the components of the system of FIG. 1 and/or other systems. Program 112 monitors adverse events associated with the AGV 110 (step 200). If program 112 fails to detect an adverse event ("no" branch decisional 205), program 112 proceeds to step 200. If program 112 detects an adverse event ("yes" branch decisional 205), program 112 causes the defensive element to be activated (step 210).

Figure 3:
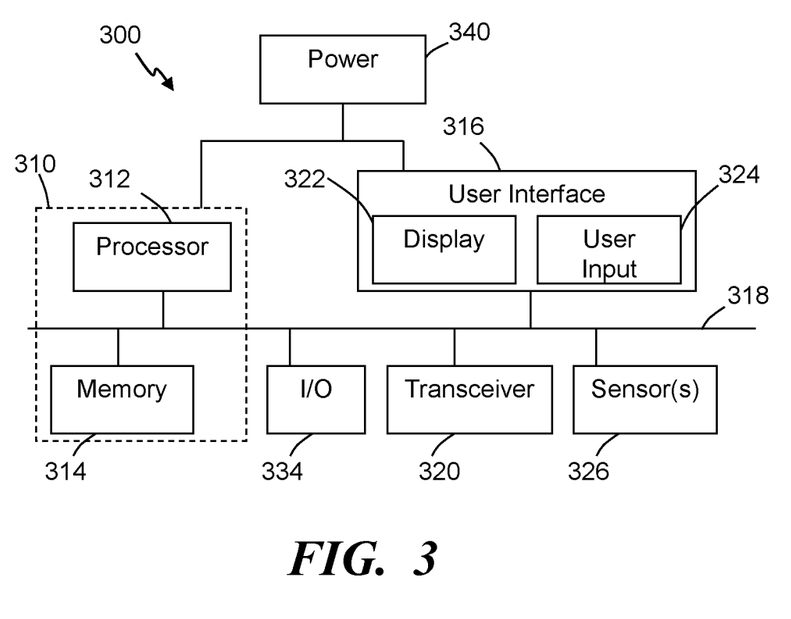
FIG. 3 illustrates an exemplary system for use in implementing methods, techniques, devices, apparatuses, systems, servers, sources and deterring theft of commercial products, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 3 illustrates an exemplary system 300 that may be used for implementing any of the components, circuits, circuitry, systems, functionality, apparatuses, processes, or devices of the AGV 110, the control circuit 118 of the AGV, the computing device 130, and/or other above or below mentioned systems or devices, or parts of such circuits, circuitry, functionality, systems, apparatuses, processes, or devices. For example, the system 300 may be used to implement some or all of the AGV, the AGV control circuit 118, one or more other control circuits and/or processing systems of the AGV (e.g., video processing systems, image processing systems, sensor data processing systems, emitter system, and the like), one or more control and/or processing systems of the computing device 130, one or more remote central control systems, and/or other such components, circuitry, functionality and/or devices. However, the use of the system 300 or any portion thereof is certainly not required.

By way of example, the system 300 may comprise a control circuit or processor module 312, memory 314, and one or more communication links, paths, buses or the like 318. Some embodiments may include one or more user interfaces 316, and/or one or more internal and/or external power sources or supplies 340. The control circuit 312 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 312 can be part of control circuitry and/or a control system 310, which may be implemented through one or more processors with access to one or more memory 314 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 300 may be used to implement one or more of the above or below, or parts of, components, circuits, systems, processes and the like.

The user interface 316 can allow a user to interact with the system 300 and receive information through the system. In some instances, the user interface 316 includes a display 322 and/or one or more user inputs 324, such as buttons, touch screen, track ball, keyboard, mouse, etc., which can be part of or wired or wirelessly coupled with the system 300. Typically, the system 300 further includes one or more communication interfaces, ports, transceivers 320 and the like allowing the system 300 to communicate over a communication bus, a distributed computer and/or communication network 140 (e.g., a local area network (LAN), the Internet, wide area network (WAN), etc.), communication link 318, other networks or communication channels with other devices and/or other such communications or combination of two or more of such communication methods. Further the transceiver 320 can be configured for wired, wireless, optical, fiber optical cable, satellite, or other such communication configurations or combinations of two or more of such communications. Some embodiments include one or more input/output (I/O) ports 334 that allow one or more devices to couple with the system 300. The I/O ports can be substantially any relevant port or combinations of ports, such as but not limited to USB, Ethernet, or other such ports. The I/O interface 334 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 326 to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), cameras, motion sensors, inertial sensors, accelerometers, impact sensors, pressure sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 300 comprises an example of a control and/or processor-based system with the control circuit 312. Again, the control circuit 312 can be implemented through one or more processors, controllers, central processing units, logic, software and the like. Further, in some implementations the control circuit 312 may provide multiprocessor functionality.

The memory 314, which can be accessed by the control circuit 312, typically includes one or more processor readable and/or computer readable media accessed by at least the control circuit 312, and can include volatile and/or nonvolatile media, such as RAM, ROM, EEPROM, flash memory and/or other memory technology. Further, the memory 314 is shown as internal to the control system 310; however, the memory 314 can be internal, external or a combination of internal and external memory. Similarly, some or all of the memory 314 can be internal, external or a combination of internal and external memory of the control circuit 312. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 140. The memory 314 can store code, software, executables, scripts, data, content, lists, programming, programs, log or history data, user information, customer information, product information, and the like. While FIG. 3 illustrates the various components being coupled together via a bus, it is understood that the various components may actually be coupled to the control circuit and/or one or more other components directly.

In some embodiments, autonomous product delivery systems are provided to deter theft of commercial products, and may comprise: an AGV on a commercial product delivery route and configured to transport one or more commercial products to one or more delivery locations. The AGV may include one or more control circuits, one or more container storage areas communicatively coupled to the one or more control circuits and housing therein one or more commercial products for delivery, one or more sensors communicatively coupled to the control circuit and configured to transmit sensor data to the control circuit, and one or more defensive elements communicatively coupled to the one or more control circuits. The one or more defensive elements may be positioned proximate to the commercial products and configured to physically alter the one or more commercial products and thereby render the one or more commercial products unsatisfactory for their intended purpose. The control circuit(s) can determine the presence of one or more unknown third parties positioned within a threshold distance relative to the AGV. In response to determining the presence of the unknown third parties, the control circuit(s) can determine occurrences of one or more adverse events associated with the AGV. Some embodiments, in response to determining the occurrence of an adverse event, the control circuit(s) can activate the one or more defensive elements to physically alter the one or more commercial products.

In some embodiments, methods of autonomous product delivery are provided for deterring theft of commercial products. Some of these methods determine, using sensor data from a sensor of an AGV on a commercial product delivery route, a presence of one or more unknown third parties positioned within a threshold distance relative to the AGV. The AGV may include one or more container storage areas as well as one or more defensive elements positioned proximate to each of the container storage areas. Each container storage area may be configured to house one or more commercial products therein. The defensive element(s) may be configured to physically alter the commercial product(s) and thereby render them unsatisfactory for their intended purpose. When the presence of the one or more unknown third parties is determined, the occurrence of one or more adverse events associated with the AGV may be determined using sensor data and through the AGV. One or more defensive elements may be activated to physically alter the one or more commercial products when the occurrence of the adverse event(s) is determined.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An autonomous product delivery system to deter theft of commercial products, comprising:
   an autonomous ground vehicle ("AGV") on a commercial product delivery route and configured to transport a commercial product to a delivery location comprising:
      a control circuit;
      a container storage area communicatively coupled to the control circuit and housing therein one or more commercial products for delivery;
      a sensor communicatively coupled to the control circuit and configured to transmit sensor data to the control circuit;
      a defensive element communicatively coupled to the control circuit, positioned proximate to the one or more commercial products, and configured to physically alter the one or more commercial products and thereby render the one or more commercial products unsatisfactory for their intended purpose; and
      the control circuit configured to:
         determine, using the sensor data, a presence of an unknown third party positioned within a threshold distance relative to the AGV;
         determine, using the sensor data, an occurrence of an adverse event associated with the AGV when the presence of the unknown third party is determined; and
         activate the defensive element when the occurrence of the adverse event is determined to physically alter the one or more commercial products.

2. The system of claim 1, wherein the adverse event comprises a loss of wireless communication capability by the AGV for a predetermined time period.

3. The system of claim 1, wherein the adverse event comprises a loss of primary power to the AGV for a predetermined time period.

4. The system of claim 1, wherein the adverse event comprises detecting an unauthorized attempt to gain access to the AGV.

5. The system of claim 1, wherein the defensive element comprises a reservoir storing a chemical, and a dispenser coupled with the reservoir, wherein the activation of the defensive element comprises activating the dispenser to dispense the chemical from the reservoir onto a surface of or within the one or more commercial products to physically alter the one or more commercial products.

6. The system of claim 1, wherein the defensive element comprises an expanding component, and wherein the activation of the defensive element comprises activating the expanding component to at least partially compress the one or more commercial products to physically alter the one or more commercial products.

7. The system of claim 1, wherein the defensive element comprises a projectile discharging system, and wherein the activation of the defensive element comprises activating the projectile discharging system to discharge one or more projectiles into at least a portion of the one or more commercial products to physically alter the one or more commercial products.

8. The system of claim 1, wherein the defensive element comprises a material having a high potential energy, and wherein the activation of the defensive element comprises activating the material to cause the material to undergo an event selected from the group consisting of: a detonation and a deflagration.

9. The system of claim 1, wherein the control circuit is further configured to:
   receive a notification to disarm from a third party; and
   deactivate the defensive element in response to receiving the notification to disarm.

10. A method of autonomous product delivery to deter theft of commercial products, comprising:
   determining, using sensor data from a sensor of an autonomous ground vehicle (AGV) on a commercial product delivery route, a presence of an unknown third party positioned within a threshold distance relative to the AGV, the AGV comprising a container storage area and a defensive element positioned proximate to the container storage area, the container storage area housing one or more commercial products therein, the defensive element configured to physically alter the one or more commercial products and thereby render the one or more commercial products unsatisfactory for their intended purpose;

determining, using the sensor data and through the AGV, an occurrence of an adverse event associated with the AGV when the presence of the unknown third party is determined; and activating, using the sensor data and through the AGV, the defensive element when the occurrence of the adverse event is determined to physically alter the one or more commercial products.

11. The method of claim 10, wherein the step of determining the occurrence of the adverse event comprises
processing, using the sensor data through the AGV, an image captured within a threshold distance relative to the AGV; and
detecting, through the AGV, the presence an unknown object included in the captured image, the unknown object comprising a threshold relationship to predefined parameters defining a biological entity or an autonomous vehicle.

12. The method of claim 10, wherein the step of determining the occurrence of the adverse event comprises detecting, through the AGV, a loss of wireless communication by the AGV for a predetermined time period.

13. The method of claim 10, wherein the step of determining the occurrence of the adverse event comprises detecting, through the AGV, a loss of primary power to the AGV for a predetermined time period.

14. The method of claim 10, wherein the step of determining the occurrence of the adverse event comprises detecting, through the AGV, an unauthorized attempt to gain access to the AGV.

15. The method of claim 10, wherein the step of activating the defensive element comprises dispensing, through the AGV, a chemical on to a surface of or within the one or more commercial products to physically alter the one or more commercial products.

16. The method of claim 10, wherein the step of activating the defensive element comprises at least partially compressing, through the AGV, the one or more commercial products to physically alter the one or more commercial products.

17. The method of claim 10, wherein the step of activating the defensive element comprises discharging, through the AGV, one or more projectiles into at least a portion of the one or more commercial products to physically alter the one or more commercial products.

18. The method of claim 10, wherein the step of activating the defensive element comprises causing, through the AGV, a high potential energy material to undergo an event selected from the group consisting of: a detonation and a deflagration.

19. The method of claim 10, further comprising:
receiving, through the AGV, a notification to disarm from a third party; and
deactivating, through the AGV, the defensive element in response to receiving the notification to disarm.

* * * * *